(12) United States Patent
Conrad et al.

(10) Patent No.: US 8,353,654 B2
(45) Date of Patent: *Jan. 15, 2013

(54) INTEGRATED FASTENER AND SEALING SYSTEM FOR PLUMBING FIXTURES

(75) Inventors: Paul D. Conrad, Ashland, OH (US); Stephen C. Detweiler, Harville, OH (US)

(73) Assignees: Mansfield Plumbing Products, Perrysville, OH (US); The Philpott Rubber Company, Brunswick, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/048,208

(22) Filed: Mar. 15, 2011

(65) Prior Publication Data

US 2011/0164943 A1   Jul. 7, 2011

Related U.S. Application Data (63) Continuation of application No. 12/079,052, filed on Mar. 24, 2008, now Pat. No. 7,918,634.

(51) Int. Cl.
*A47G 3/00* (2006.01)

(52) U.S. Cl. ............... 411/377; 411/369; 411/372.5; 411/542; 411/914

(58) Field of Classification Search ............ 411/369, 411/372.5, 373, 377, 392, 396, 542, 907–908, 411/914
See application file for complete search history.

(56) References Cited

U.S. PATENT DOCUMENTS

| | | | |
|---|---|---|---|
| 1,936,775 A | 11/1933 | Stedman | |
| 2,326,455 A | 8/1943 | Gray | |
| 2,528,288 A | 10/1950 | Rublee | |
| 2,671,227 A | 3/1954 | Butow | |
| 2,724,303 A | 11/1955 | Holcomb | |
| 2,752,814 A | 7/1956 | Iaia | |
| 2,884,099 A | 4/1959 | Nenzell | |
| 2,890,845 A | 6/1959 | Kiekhaefer | |
| 3,087,370 A * | 4/1963 | Iaia | 411/369 |
| 3,149,850 A | 9/1964 | Fishcher | |
| 3,198,058 A | 8/1965 | Barry | |
| 3,457,823 A | 7/1969 | Dillon | |
| 3,476,010 A | 11/1969 | Markey | |
| 3,642,937 A | 2/1972 | Deckert et al. | |
| 3,983,304 A | 9/1976 | Sekhon | |
| 4,062,526 A | 12/1977 | Green | |
| 4,154,138 A | 5/1979 | Melone | |
| 4,182,189 A | 1/1980 | Dock et al. | |
| 4,335,752 A | 6/1982 | Sumner | |
| 4,428,982 A | 1/1984 | Wallace | |
| 4,472,097 A * | 9/1984 | Kiefer et al. | 411/369 |
| 4,657,460 A | 4/1987 | Bien | |
| 4,681,497 A | 7/1987 | Berecz | |
| 4,821,381 A * | 4/1989 | Kaneko et al. | 24/297 |
| 4,987,714 A | 1/1991 | Lemke | |
| 5,290,131 A * | 3/1994 | Henriksen | 411/180 |
| 5,470,111 A | 11/1995 | Nelson et al. | |
| 5,518,351 A | 5/1996 | Peil | |
| 5,553,984 A | 9/1996 | Smith | |

(Continued)

*Primary Examiner* — Roberta Delisle (74) *Attorney, Agent, or Firm* — Rankin, Hill & Clark LLP (57) ABSTRACT

A metallic bolt fastener assembly that includes a threaded shank, a head and an end, the head and a portion of the shank encapsulated with a polymer composition. The polymer composition includes a polymer material such as natural rubber, synthetic rubber or thermal plastic materials. The polymer composition provides improved corrosion resistance and superior fluid sealing properties when used as a water tank-to-toilet bowl or other similar plumbing fixture connection system.

18 Claims, 5 Drawing Sheets

U.S. PATENT DOCUMENTS

| | | |
|---|---|---|
| 5,875,496 A | 3/1999 | Schaffer |
| 5,956,816 A | 9/1999 | McCrink |
| 6,244,807 B1 | 6/2001 | Garcia |
| 6,247,746 B1 | 6/2001 | Brush |
| 6,435,793 B1 | 8/2002 | Dobson |
| 6,436,474 B2 | 8/2002 | Godsted et al. |
| 6,739,813 B1 | 5/2004 | Gundy et al. |
| 7,165,293 B2 | 1/2007 | Musil et al. |
| 2003/0182719 A1* | 10/2003 | Glesson .................. 4/236 |

* cited by examiner

INTEGRATED FASTENER AND SEALING SYSTEM FOR PLUMBING FIXTURES

This application is a continuation of application Ser. No. 12/079,052 filed on Mar. 24, 2008 which is incorporated by reference into this application in its entirety.

This invention relates to a fastener and, more particularly, to a fastener with an integral encapsulated portion that is utilized to assemble two or more components of a plumbing fixture.

INCORPORATION BY REFERENCE

This invention relates to fasteners and, more particularly, to an encapsulated fastener utilized to assemble two or more components of a plumbing fixture. U.S. Pat. No. 6,436,474 to Godsted discloses a method of coating fasteners and is incorporated by reference as background material for showing the same. U.S. Pat. No. 7,165,293 to Musil discloses a conveyor fastener and is incorporated by reference as background material for showing the same.

BACKGROUND OF THE INVENTION

Traditional toilet assembly design utilized bolt fasteners to connect the tank to the bowl with a polymer washer on the inside of the tank through two pieces of vitreous china followed by a steel washer and a fastener nut on the outside of the bowl. This assembly was intended not only to mechanically secure the tank to the bowl, but also prevent the water or water/chemical fluids from leaking out of the tank. Once the bolts, steel and polymer washers and nuts were assembled in the proper order, each fastener assembly was tightened using wrenches and/or screwdrivers. In addition to the labor intensive nature of this process, components of the fastener assembly were lost and assemblies were improperly secured. In addition, washer components often only provided a marginal compression seal often resulting in leaks from the tank. Due to the design of this fastening system, the metallic bolt is continuously submerged in water on the inside of the tank and exposed to condensate water on the outside of the tank. These conditions cause corrosion of the bolt, which, in turn, can result in leaks and/or difficulty in removing the bolts when servicing the toilet.

Fasteners, such as bolts of mild or stainless steel, brass or other metals, that are to be exposed to moisture and chemicals used in the plumbing industry are typically made from bars or rods that may have been bare or plated or galvanized, usually with zinc. The plating process is typically either by electrolytic deposition of zinc or via dipping the bolt fastener into a molten zinc bath or pot. The latter is characterized as a "hot dipping" process.

The metal used for these bolt fasteners may be composed of various alloys that demonstrate significant property differences depending upon the degree of cold working, differences in the basic metal constituents, and whether or not a stress relieving (patenting or annealing) process stage has been introduced.

Such bare and plated bolt fasteners are commonly used in the plumbing industry. In the case of a toilet, several (typically two or three) bolt fasteners were used to mechanically connect the water holding vessel, commonly referred to as the "tank", to the toilet bowl. This was accomplished by inserting the bolt through matching holes in the tank and bowl with a nut on the bowl side providing the balance of the mechanical assembly between the tank and bowl. Since the bolt head and portion of the bolt shank immediately adjacent to the head are installed on the inside of the tank, they are continuously exposed to water and chemical additives. Corrosion is an electrochemical process that allows a refined metal to revert to its native oxide state (rust). In order for corrosion to occur, an electrolyte must be present. The water or water/chemical mixture in the tank acts as this electrolyte and reacts with the exposed bolt surfaces causing them to corrode. When the bolt corroded, the fastener system was difficult or impossible to remove and replace using common hand tools.

The portion of the bolt fastener shank that extends from the outside of the bowl and onto which the bolt has been assembled does not come into contact with the water or water/chemical electrolyte on the inside of the tank. However, condensate water often forms on the exterior of the tank, especially in humid environments. This condensate water often travels down the bowl and onto the bolt fastener shank on the underside of the bowl. Since condensate water also acts as an electrolyte, corrosion often occurred on the bolt shank making it difficult or impossible to remove and replace the tank to bowl fastener using common hand tools.

In order to improve the corrosion resistance of the bolt fasteners, improve the seal against tank leaks, improve ease of installation and reduce fastener assembly part count, there is a need or desire for a fastener system that reduces corrosion and more effectively prevents the tank from leaking. There is also a need for a bolt fastener system that is easier to install using the minimum number of commonly available hand tools.

SUMMARY OF THE INVENTION

In accordance with the present invention, provided is a bolt fastener that combines mechanical connection function between the tank and bowl with a sealing and an encapsulation feature into a single component part.

More particularly, provided is a polymer encapsulated fastener wherein the head and a portion of its shank are encapsulated. This encapsulation can be used to isolate the metallic components of the bolt fastener that are installed on the inside of the tank from the corrosive water or water/chemical electrolyte contained in the tank thus protecting the bolt from corrosion.

In one embodiment, the fastener assembly can be further protected from corrosion by applying a secondary coating. This coating can be an electrochemically active, protective plating, such as a galvanic zinc, aluminum or magnesium, over substantially all of the metal surface prior to encapsulating the bolt head and shank to form a corrosion resistant, plated fastener. Because zinc is electrochemically more active than the underlying metal bolt fastener, the relatively more electrochemically passive steel bolt fastener is protected from corrosion via the galvanic process. This adds to the corrosion resistance of the entire bolt fastener. This plating is particularly important in preventing corrosion of the condensate water exposed bolt fastener shank under the bowl.

In another embodiment of the present invention, the fastener can include a sealing portion formed into the encapsulation. This can include an o-ring seal molded into a polymer encapsulation on the bottom flat face of the encapsulated bolt head. In yet another embodiment, multiple sealing configurations can be included on the fastener. This can include sealing rings molded into the encapsulation that covers the bolt shank immediately adjacent to the bolt fastener head. The circumferential sealing rings would then be inserted through the pre-cast holes from the inside of the tank bottom using limited load force. The circumferential sealing rings make contact with the outer edge of the pre-cast holes in the tank, thus providing an improved water seal and preventing fluid from leaking from the tank.

With the foregoing in mind, it is a feature and advantage of the invention to provide a bolt fastener assembly with a unique degree of corrosion resistance. This is accomplished by plating the surface of all metallic components of the fastener assembly with a galvanic metal, which is anodic to the underlying bolt material.

It is also a feature and advantage of the invention to provide an encapsulation of the bolt fastener that provides a high integrity hydrostatic seal to prevent leaks from the tank. The invention can create a plurality of sealing points.

BRIEF DESCRIPTION OF THE DRAWINGS

The foregoing, and more, will in part be obvious and in part be pointed out more fully hereinafter in conjunction with a written description of preferred embodiments of the present invention illustrated in the accompanying drawings in which.

DESCRIPTION OF PREFERRED EMBODIMENTS

Figure 1:
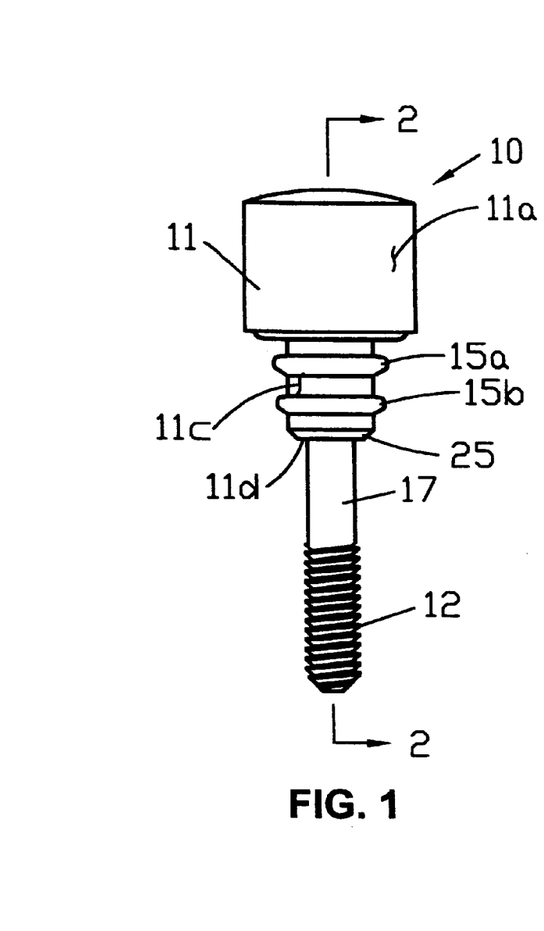
FIG. 1 is a side view of a fastener assembly according to an aspect of the present invention.
Figure 2:
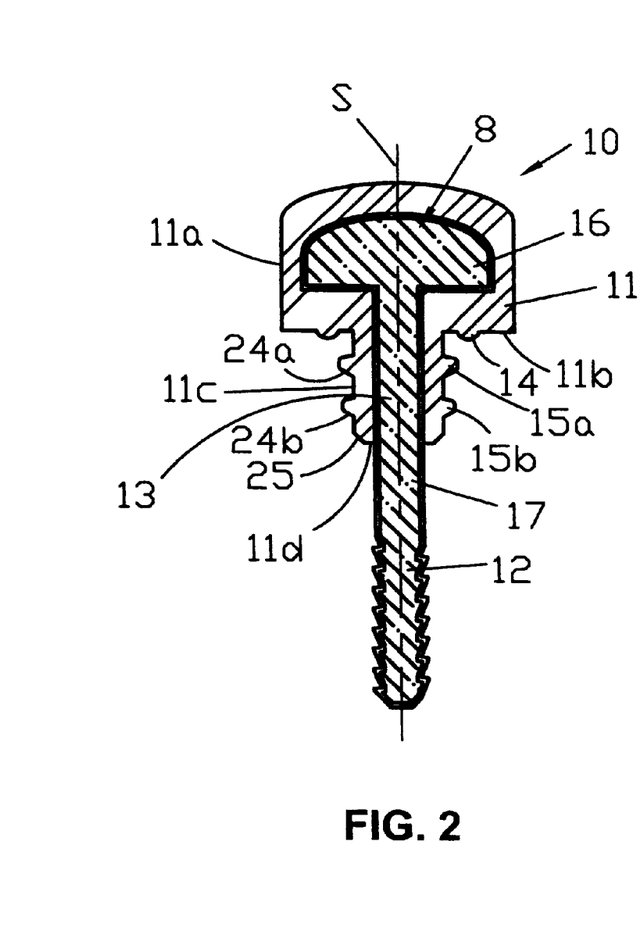
FIG. 2 is a sectional view taken along lines 2-2 in FIG. 1.
Figure 3:
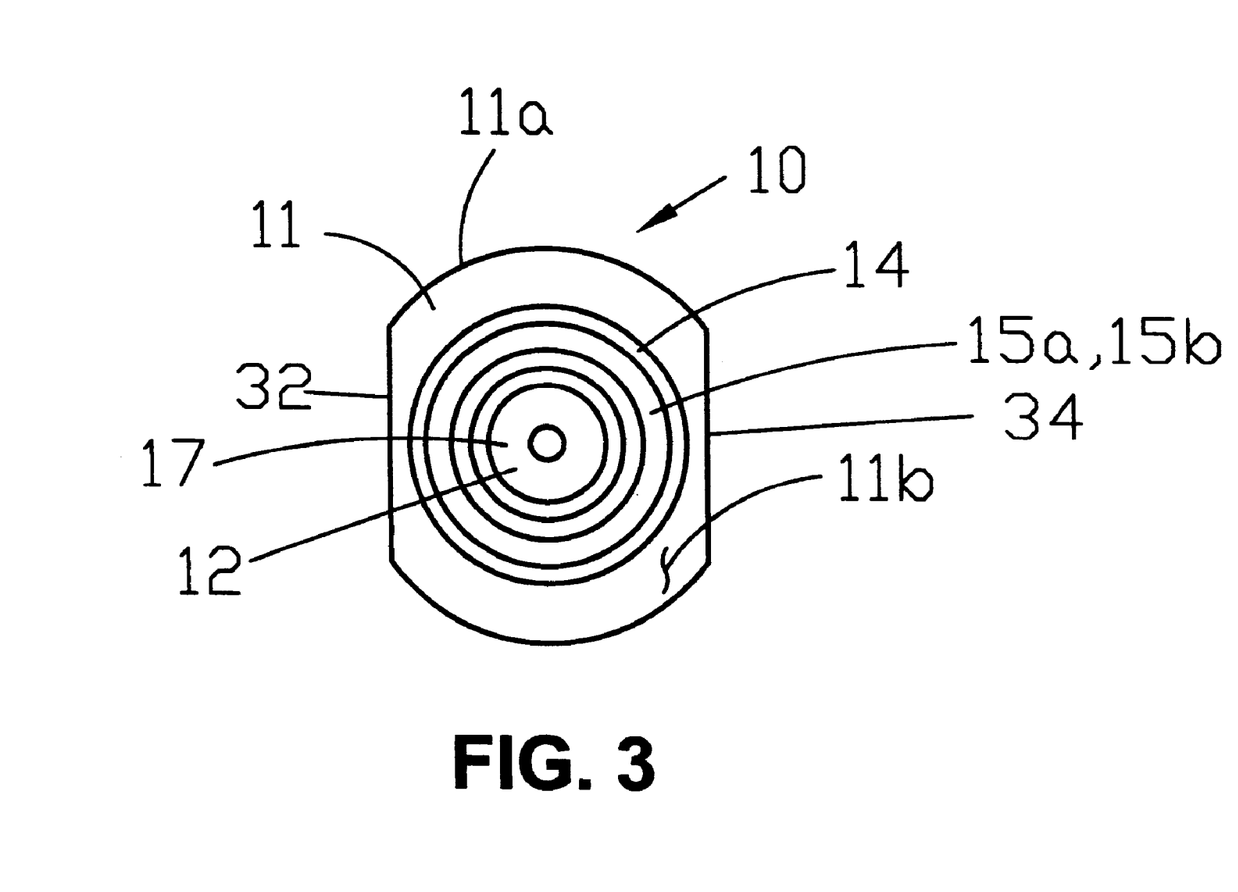
FIG. 3 is a bottom view of the fastener shown in FIG. 1.

Referring now in greater detail to the drawings wherein the showings are for the purpose of illustrating preferred embodiments of the invention only, and not for the purpose of limiting the invention, FIGS. 1-3 show a fastener bolt 10 having a fastener body 8 extending along axis S that, in this embodiment, is made from a metallic material and which includes an upper expanded head 16 and a bolt shaft 13 centered about axis S. Shaft 13 includes an elongated, non-threaded shaft portion 17 and a lower threaded end portion 12.

Fastener 10 further includes an encapsulating portion 11 that is formed by a deformable material. In one embodiment, this portion is formed by a monolithic, polymeric material and is bonded to and encapsulates the expanded head end 16 of the bolt and extends partway down the bolt shaft.

The encapsulated portion includes an outer head surface 11a, a lower head surface or lower flat face 11b, a shaft surface 11c and a thread facing surface 11d. As can be appreciated, the dimensions of these surfaces and the dimensions of the fastener body are dependent on the particular application of fastener 10 and can change without detracting from the invention of this application which will be discussed in greater detail below.

In another embodiment, encapsulation 11 includes one or more o-rings 14 extending from surface 11b which is immediately below the head portion of the bolt. As will also be discussed in greater detail below, o-ring 14 can be used to help seal the opening in which fastener 10 extends through.

Fastener 10 can further include one or more circumferential sealing ribs 15a and 15b extending radially from surface 11c. These ribs can be used by themselves or in combination with o-ring 14 to help seal the opening in which fastener 10 extends through.

Fastener 10 can also include a chamfer 25 at end 11d to aid in positioning the fastener into the opening in which fastener 10 extends through. Further, ribs 15a and 15b can also include an angled leading edge 24a and 24b, respectively, to help position the fastener in the opening while allowing a snug fit between the components.

While it has been found that this invention works particularly well with metallic bolts, this invention has broader applications wherein the invention is not limited to metallic bolts; but is also applicable to non-metallic materials such as plastic or composite bolt materials. In addition, the bolt threads could extend the entire length of the shaft to the expanded head.

In yet another embodiment, body 10 is plated with an electrochemically active, protective film, such as a galvanic zinc, aluminum or magnesium, over substantially the entire metal surface prior to encapsulating the bolt head and shank to form a corrosion resistant, plated fastener. The protective film can be applied by any method known in the art including, but not limited to, quenching the bolt in the molten, galvanic metal, through arc spraying or by electro-plating.

The polymer encapsulation 11 is bonded to and molded around the expanded head end 16 and a portion of the elongated shaft 17 of the bolt. This can be done by placing the bolt in a mold of the shape of the final monolithic encapsulation 11, including the expanded head 19, o-ring 14 and raised circumferential ribs 15. Uncured polymer compound is then introduced into the mold via compression, transfer or injection method and is vulcanized using heat and pressure. While a wide range of pliable materials can be used, it has been found that a monolithic encapsulation of natural or synthetic rubber works well for the encapsulation. However, other materials such as thermal plastics can also be used.

The polymer encapsulation should have sufficient thickness to provide adequate mechanical strength to withstand the use of hand tools, such as a wrench, pliers, vice grip or screw/nut drive, during the installation of fastener assembly. In one embodiment of the invention, a polymer encapsulation thickness of between 0.080" and 0.188" is used. However, greater or lesser thicknesses of encapsulation can be used depending on the difference between the fastener bolt shaft 17 and the opening. Further, the thickness of the encapsulation can be used to allow one fastener body 8 to be used on multiple applications or holes.

Figure 4:
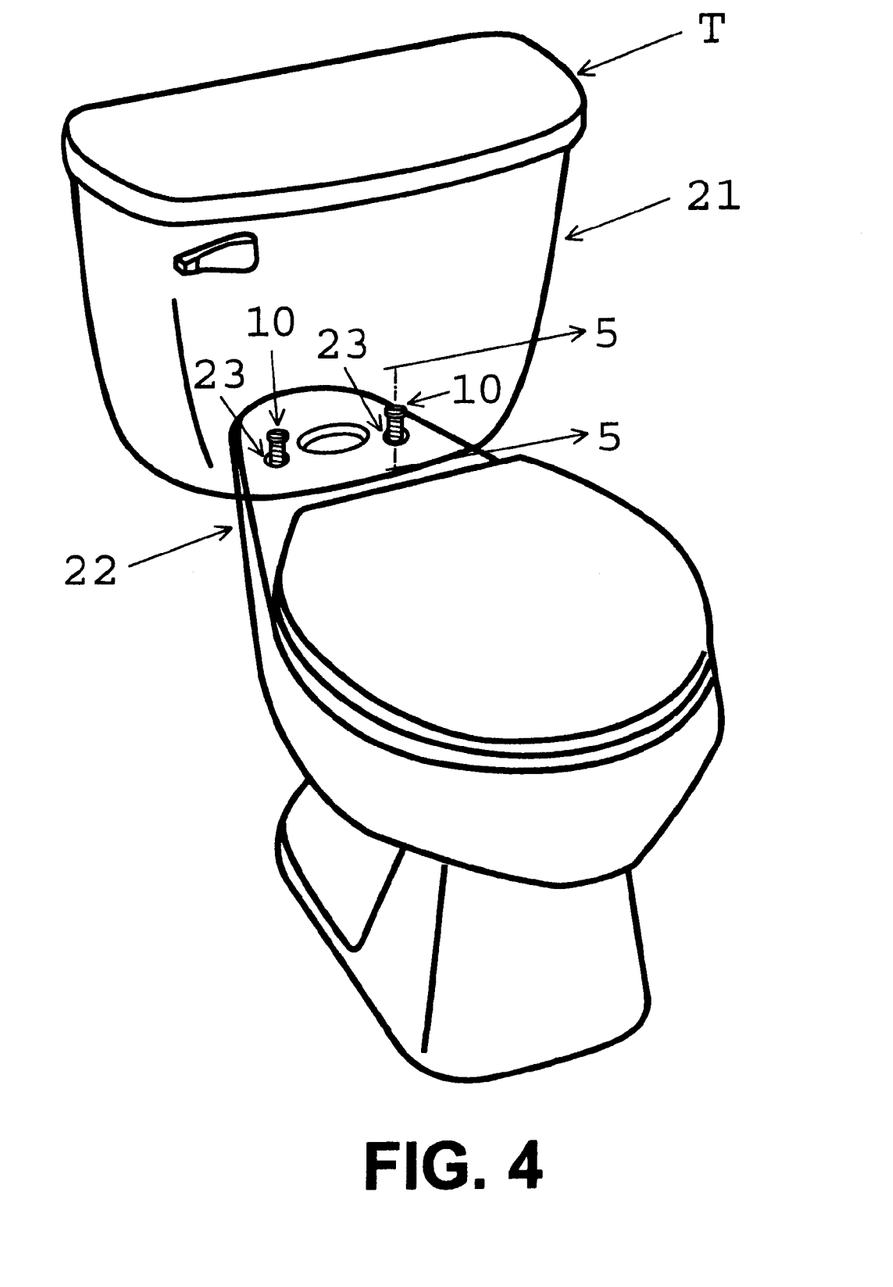
FIG. 4 is a perspective view of a toilet that includes two of the fasteners shown in FIG. 1.
Figure 5:
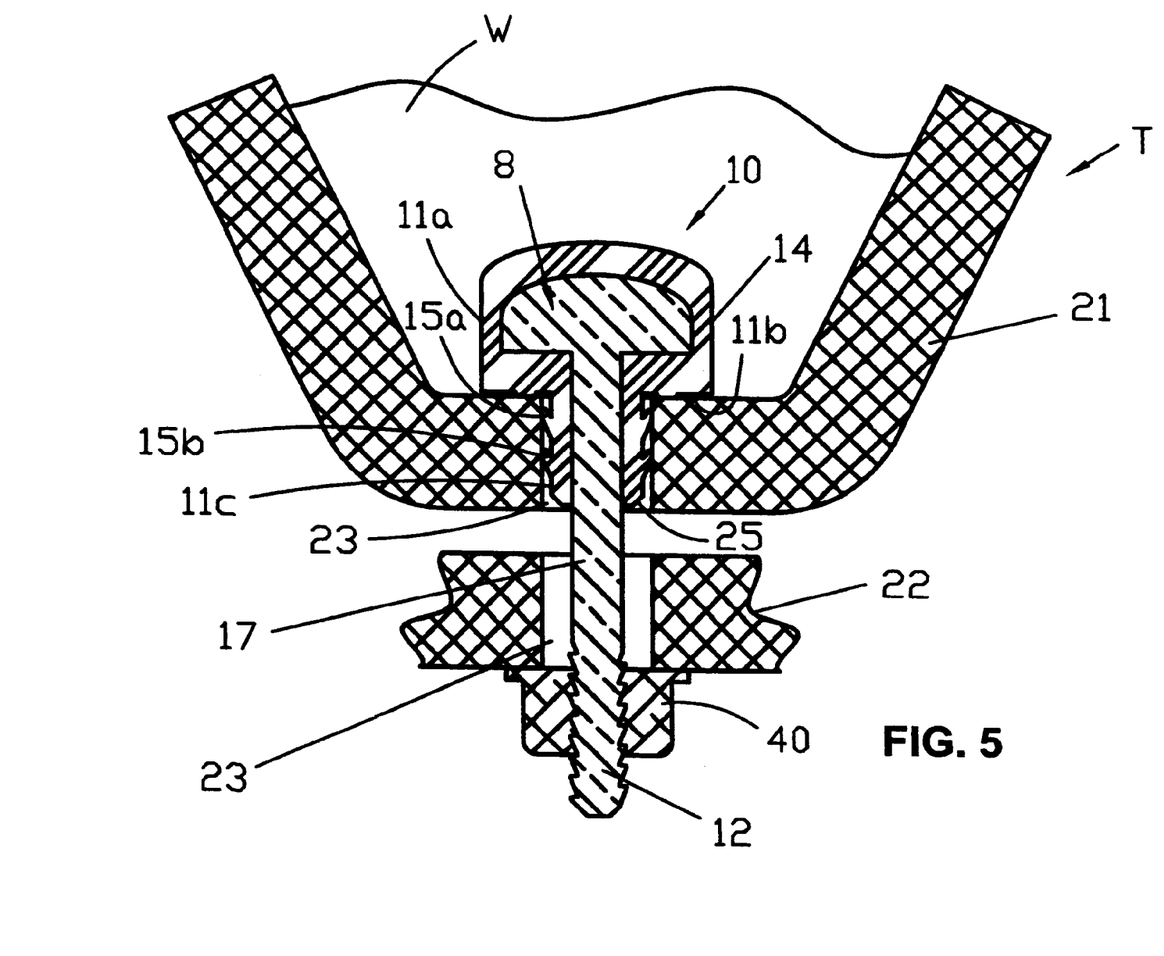
FIG. 5 is a sectional view taken along lines 5-5 in FIG. 4.

With reference to FIGS. 4 and 5, shown is a toilet T having a tank 21 and a bowl 22 with fastener openings 23 extending through both. In this embodiment, the polymer encapsulation should have sufficient thickness to provide adequate sealing properties in openings 23. In this respect, the encapsulation should be sized to snugly fit into openings 23 in both tank 21 and bowl 22 to form a hydrostatic seal to prevent water W contained internally in the tank 21 from leaking to the outside of the tank 21 through fastener bolt holes 23 of the tank 21.

The polymer used for the encapsulation is to be soft enough to allow the o-ring 14 and/or circumferential ribs 15 to compress and form a water-tight seal on the inside of the tank 21. Desirably, a polymer material with a Durometer of between 60 and 70 is used. Materials with a Durometer ranging between 30 and 90 can also be used.

Installation

Figure 6:
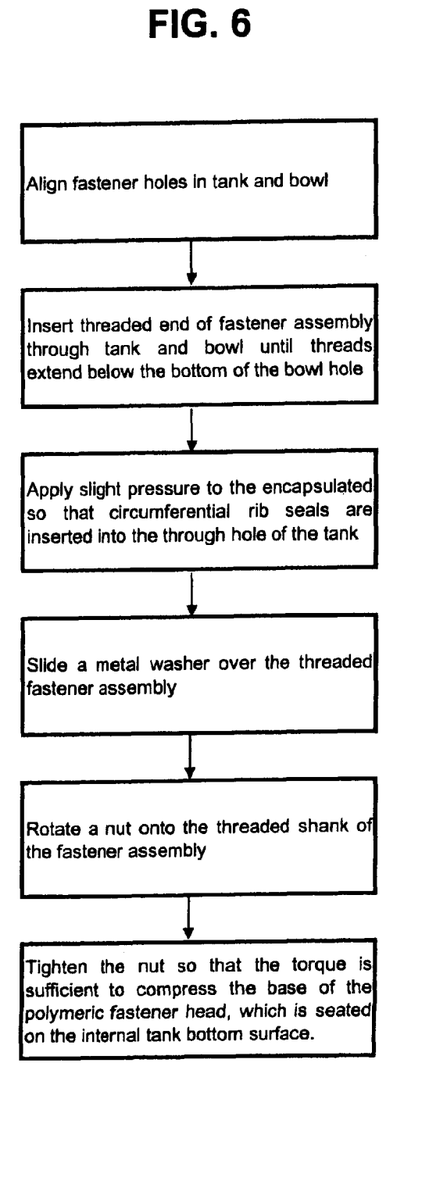
FIG. 6 is a flow diagram for a method of assembly for a fastener such as the fastener shown in FIG. 1; and, FIG. 7 is a flow diagram for another method of assembly a fastener such as the fastener shown in FIG. 1.
Figure 7:
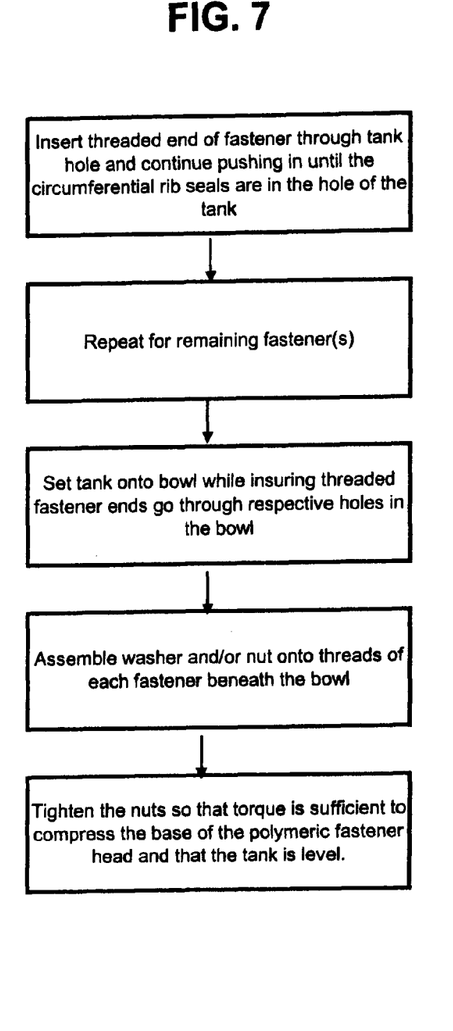

Also with reference to FIGS. 6 & 7, shown are the steps for installing a fastener according to the present invention. More particularly, before installing the fastener assembly, the two or more fastener holes in the bottom of the toilet tank are aligned with the fastener installation holes on the top of the toilet bowl. Fastener 10 is then inserted through each of the holes in the tank and then through each aligned hole in the bowl until a portion of bolt threads 12 extend from the bottom of the bowl. The circumferential ribs of the encapsulation are configured to provide resistance as the fastener is inserted into the aligned holes in the tank and bowl, which is overcome with hand-applied pressure.

A metallic or non metallic nut 40 is then rotated onto each fastener assembly's bolt threads. As can be appreciated, any nut known in the art can be used without detracting from the invention of this application. Each nut is hand tightened into the position where the threaded bolt extends from the bottom of the bowl. The top of each fastener 10 on the inside of the tank is held in place by hand or an appropriate hand tool while the nut below the bottom of the bowl is tightened using an appropriate hand or power tool. The nut is tightened until the integral o-ring portion of the polymeric encapsulation has completely compressed and the immediately adjacent flat bottom surface of the polymeric encapsulation begins to compress against the inside bottom of the tank.

As can be appreciated, faster 10 can include any know tool receiving configuration without detracting form the invention of this application. This can include, but is not limited to flats 32 and 34 which are best shown in FIG. 3, a flathead/slotted drive, a crosshead/phillips drive, a pozdriv/supradriv drive, a torx drive, a hex/allen drive, a robertson drive, a tri-wing drive, a torq-set drive, a spanner head drive, or even a triple square/XZN drive. Yet even further, the fastener can include no tool receiving configuration without detracting from the invention of this application. In one embodiment, the faster can include a cylindrical head with no tool receiving configuration. In even yet another embodiment, the fastener can be configured such that ribs 15*a* and 15*b* and/or other portions of the encapsulation produce a resistance fit between the fastener and the fastener opening such that a tool is not required to prevent rotation of the fastener relative to the hole when the nut is tightened.

Compression of the o-ring and its immediately adjacent bottom flat surface of the polymeric encapsulation against the inside bottom of the tank as each nut is tightened forms the desired hydrostatic seal at the bolt holes where the fastener assemblies are inserted. The circumferential sealing rings of the polymeric encapsulation around the bolt shaft add to the hydrostatic seal within the tank.

It will be apparent to those skilled in the art that the present invention is capable of further cooperative uses with other plumbing fixture related fastener components and systems. Accordingly, the uses for our fastener assembly of the present invention are myriad and it is plain that the present invention provides utility beyond what is illustrated here.

With special reference to FIG. 6, one method of installation includes the steps of:

Align fastener holes in tank and bowl;
Insert threaded end of fastener assembly according to the present invention through tank and bowl until threads extend below the bottom of the bowl hole;
Apply slight pressure to the encapsulated so that circumferential rib seals are inserted into the through hole of the tank;
Slide a metal washer over the threaded fastener assembly;
Rotate a nut onto the threaded shank of the fastener assembly; and,
Tighten the nut so that the torque is sufficient to compress the base of the polymeric fastener head, which is seated on the internal tank bottom surface.

With special reference to FIG. 7, another method of installation includes the steps of:

Insert threaded end of fastener according to the present invention through tank hole and continue pushing in until the circumferential rib seals are in the hole of the tank;
Repeat for remaining fastener(s);
Set tank onto bowl while insuring threaded fastener ends go through respective holes in the bowl;
Assemble washer and/or nut onto threads of each fastener beneath the bowl; and,
Tighten the nuts so that torque is sufficient to compress the base of the polymeric fastener head and that the tank is level.

While the embodiments of the invention described herein are presently preferred, various modifications, improvements and equivalences can be made without departing from the spirit and scope of the invention. The scope of the invention is indicated by the appended claims, and all changes that fall within the meaning and range of equivalents are intended to be embraced therein.

Having thus described our invention, it is claimed:

1. A removable fastener for securing a tank of a toilet to a corresponding bowl of the toilet, the tank having a tank bolt hole and the bowl having a corresponding bowl bolt hole, the removable fastener comprising a threaded bolt having a head and a shank extending along a shank axis from the head toward a distal end, the shank including a threaded portion extending toward the head from at least near the distal end, the threaded portion configured to threadingly engage an associated nut such that the fastener is a removable fastener, the shank having a length to extend through both an associated tank bolt hole and bowl bolt hole when in an installed position therein to allow an associated nut to selectively engage the threaded portion and force the fastener into a tightened condition, that shank further including a cross-sectional configuration to allow the shank to freely pass through the associated tank bolt hole and bowl bolt hole, the fastener further including a pliable composition coating permanently covering the entire bolt head and the coating extending down the shank toward the distal end such that the composition coating also covers a segment of the shank immediately adjacent to the head, the coating on the head having a lower face below the head and transverse to the shank axis general facing the distal end and the lower face forming a bearing surface for the engagement between the head and the associated tank when in the installed position, the bearing surface having an integral and compressible o-ring seal extending about the shank axis such that when the fastener is in the tightened condition the o-ring is compressed and at least partially produces a water tight seal about the associated tank bolt hole and the coating prevents water in the tank from engaging the head and the shank, the water tight seal is a first water tight seal, the composition coating covering further includes at least one transverse rib extending radially outwardly from the segment and about the shank axis, the at least one transverse rib deforming when the fastener is in the installed position by the engagement between the associated tank bolt hole, the at least one transverse rib producing a second water tight seal by at least partially sealing the associated tank bolt hole.

2. The fastener of claim 1, wherein the pliable composition is a polymer.

3. The fastener of claim 2, wherein the pliable composition consists essentially of one of natural rubber, synthetic rubber and thermal plastic.

4. The fastener of claim 1, wherein the at least one transverse rib has original configuration before it is in the installed position and having a compressed configuration when it is in the tightened condition, the pliable coating substantially returning to the original configuration when it is removed from the installed position.

5. The fastener of claim 1, wherein the at least one transverse rib is at least two transverse ribs extending about the shank axis.

6. The fastener of claim 1, wherein the at least one transverse rib includes a tapered portion facing the distal end to help guide the rib into the associated tank bolt opening.

7. The fastener of claim 1, wherein the cross-sectional configuration of the shank is circular wherein the shank has a shank diameter, the cross-section configuration of the segment also being circular wherein the segment has a segment diameter which is larger than the shank diameter, that at least one of the transverse rib and the segment producing a resistant fit between the fastener and the tank bolt hole.

8. The fastener of claim 1, further including a tool receiving configuration having at least two parallel flat edges in the circumferential dimension of the head and the pliable composition coating covering the head.

9. A removable fastener for securing a tank of a toilet to a corresponding bowl of the toilet, the tank having a tank bolt hole and the bowl having a corresponding bowl bolt hole, the removable fastener comprising a threaded bolt having a head and a shank extending along a shank axis from the head toward a distal end, the shank including a threaded portion extending toward the head from at least near the distal end, the threaded portion configured to threadingly engage an associated nut such that the fastener is a removable fastener, the shank having a length to extend through both an associated tank bolt hole and bowl bolt hole when in an installed position therein to allow an associated nut to selectively engage the threaded portion and force the fastener into a tightened condition, that shank further including a cross-sectional configuration to allow the shank to freely pass through the associated tank bolt hole and bowl bolt hole, the fastener further including a pliable composition coating permanently covering the entire bolt head and the coating extending down the shank toward the distal end such that the composition coating also covers a segment of the shank immediately adjacent to the head, the coating on the head having a lower face below the head and transverse to the shank axis general facing the distal end and the lower face forming a bearing surface for the engagement between the head and the associated tank when in the installed position, the bearing surface being compressible such that when the fastener is in the tightened condition the bearing surface compresses and at least partially produces a first water tight seal about the associated tank bolt hole and the coating prevents water in the tank from engaging the head and the shank, the composition coating covering further including at least one transverse rib on the segment extending radially outwardly from the shank axis, the at least one transverse rib deforming when the fastener is in the installed position by the engagement with the associated tank bolt hole, the at least one transverse rib producing a second water tight seal by at least partially sealing the associated tank bolt hole.

10. The fastener of claim 9, wherein the bearing surface further includes an integral and compressible o-ring seal extending about the shank axis such that when the fastener is in the tightened condition the o-ring is compressed and at least partially produces the first water tight seal about the associated tank bolt hole.

11. The fastener of claim 9, wherein the at least one transverse rib has original configuration before it is in the installed position and having a compressed configuration when it is in the tightened condition, the pliable coating substantially returning to the original configuration when it is removed from the installed position.

12. The fastener of claim 9, wherein the at least one transverse rib is at least two transverse ribs extending about the shank axis.

13. The fastener of claim 9, wherein the pliable composition coating is a polymer and encapsulates 10% to 50% of the fastener including the head and the segment of the shank.

14. The fastener of claim 9, wherein the pliable composition coating is a polymer and encapsulates 50% to 100% of the fastener including the head and the segment of the shank.

15. A removable fastener system for removably securing a tank of a toilet to a corresponding bowl of the toilet, the tank having a tank bolt hole and the bowl having a corresponding bowl bolt hole, the system comprising at least two bolts and at least two corresponding nuts, the at least two bolts each including a head and a shank extending along a shank axis from the head toward a distal end, the shank having a threaded portion adjacent the distal end, the threaded portion configured to threadingly engage an inner thread of one of the at least two nuts, the shank of the each bolt having a length to extend through both an associated tank bolt hole and bowl bolt hole when in an installed position therein such that the threaded portion is exposed thereby allowing the one nut to selectively threadingly engage the threaded portion and force the each bolt and one nut into a tightened condition, that shank further including a cross-sectional configuration to allow the shank to freely pass through the associated tank bolt hole and bowl bolt hole, the each bolt further including a pliable composition coating permanently covering the entire head and the coating extending down the shank toward the distal end such that the composition coating also covers a segment of the shank immediately adjacent to the head, the coating on the head having a lower face below the head and transverse to the shank axis general facing the distal end and the lower face forming a bearing surface for the engagement between the head and the associated tank when in the installed position, the bearing surface having an integral and compressible o-ring seal extending about the shank axis such that when the each bolt and nut is in the tightened condition the o-ring is compressed and at least partially produces a water tight seal about the associated tank bolt hole and the coating prevents water in the tank from engaging the head and the shank, the water tight seal is a first water tight seal, the composition coating covering further includes at least one transverse rib extending radially outwardly from the segment and about the shank axis, the at least one transverse rib deforming when the fastener is in the installed position by the engagement between the associated tank bolt hole, the at least one transverse rib producing a second water tight seal by at least partially sealing the associated tank bolt hole.

16. The fastener system of claim 15, wherein the at least one transverse rib has original configuration before it is in the installed position and having a compressed configuration when it is in the tightened condition, the pliable coating substantially returning to the original configuration when it is removed from the installed position.

17. The fastener system of claim 15, wherein the at least one transverse rib is at least two transverse ribs extending about the shank axis.

18. A removable fastener for securing a tank of a toilet to a corresponding bowl of the toilet, the tank having a tank bolt hole and the bowl having a corresponding bowl bolt hole, the removable fastener comprising bolt having a head and a shank joined to the head, the head and shank being composed of a single base material, the shank extending along a shank axis, the head having a base edge extending transversely from the shank axis and forming a bearing edge for the engagement between the fastener head and an associated tank of a toilet, the shank extending from the base edge along the shank axis to a distal end and including a threaded portion adjacent the distal end to threadingly engage an inner thread of a nut wherein the threading engagement of the nut on the threaded portion urges the fastener into a tightened condition, the bolt further including a pliable composition coating permanently covering the entire head and the coating extending down the shank thereby also covering a segment of the shank such that the coating is a unified coating covering the entire head and the segment, the coating including a sealing section covering the base edge thereby producing a pliable sealing ring extending about the shank, the pliable sealing ring being compressed between the bearing edge and the associated tank from a relaxed condition to a compressed condition when the fastener is urged into the tightened condition thereby producing a water tight seal extending about the associated tank bolt hole, the sealing ring generally returning to the relaxed condition when the fastener is removed from the associated toilet, the coating further including at least one sealing rib extending from the coating to enhance the water tight seal, the sealing rib also being compressible between a relaxed condition to a compressed condition when installed and the rib returning to the relaxed condition when the fastener is removed from the associated toilet, the coating preventing water in the tank from engaging the head and the shank when on the tightened condition.

\* \* \* \* \*